Aug. 4, 1953 M. CAMRAS 2,647,750

TWISTED LOOP MAGNETIC RECORDER

Filed Nov. 22, 1947 2 Sheets-Sheet 1

Inventor
MARVIN CAMRAS by The Firm of Charles H. Hill Attys.

Inventor
MARVIN CAMRAS by The Firm of Charles W. Hills Attys.

Patented Aug. 4, 1953 2,647,750

UNITED STATES PATENT OFFICE 2,647,750

TWISTED LOOP MAGNETIC RECORDER

Marvin Camras, Chicago, Ill., assignor to Armour Research Foundation of Illinois Institute of Technology, Chicago, Ill., a corporation of Illinois Application November 22, 1947, Serial No. 787,522

2 Claims. (Cl. 274—4)

This invention relates to a magnetic recorder, and more particularly, to a twisted loop magnetic recorder.

In magnetic recording, there are many circumstances in which it is desirable to have a continuous loop so that when the magnetic record is played back, it immediately starts over again without having an interruption for rewinding. One of the great disadvantages in most endless loop magnetic recorders lies in the fact that it is difficult to get a sufficient length of material for the endless record. For an extremely simple and inexpensive magnetic recorder, it is desirable to have an endless loop which requires no winding and which does not require either the head or the tape to be shifted laterally in order to effect the recording or play-back operation.

There are other circumstances in which it is desirable to have a continuous loop which is wound up on and taken from the same spool, but in which the spool is relatively small to facilitate handling.

One of the principal features and objects of the present invention is to provide a novel method of handling and passing a tape record medium past an electromagnetic transducer head.

Another object of the present invention is to provide a magnetic recorder having a novel arrangement for handling an endless loop tape record member.

A further object of the present invention is to provide a novel twisted loop magnetic recorder.

Another and still further object of the present invention is to provide a novel magnetic recorder having a record member in the form of a non-magnetic carrier having a coating of magnetic material on both sides thereof, and in which first one side and then the other passes the electromagnetic transducer head of the instrument.

The novel features which I believe to be characteristic of my invention are set forth with particularity in the appended claims. My invention itself, however, both as to its manner of construction and method of operation, together with further objects and advantages, may best be understood by reference to the following description taken in connection with the accompanying drawing, in which:

Figures 1, 2, 3:
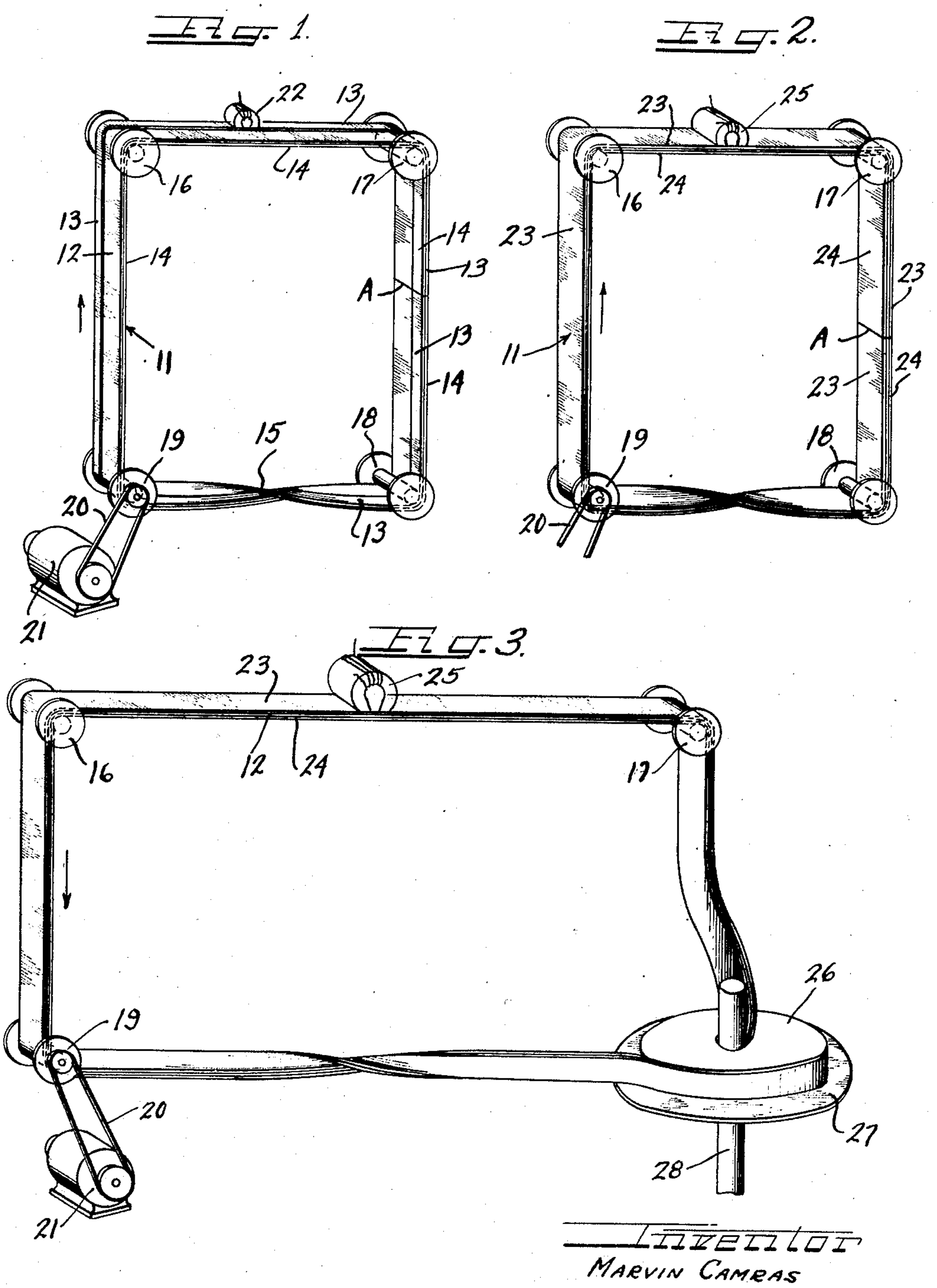
Figure 1 is a diagrammatic illustration of a twisted loop magnetic recorder in which the endless loop record member is coated, and in which the electromagnetic transducer head covers only half of the tape.
Figure 2 is a view similar to Figure 1, but illustrating an arrangement in which a non-magnetic tape carrier is coated on both sides with magnetic material, and in which the electromagnetic transducer head covers the entire width of the tape.
Figure 3 is a diagrammatic view of a twisted loop magnetic recorder in which the endless tape is wound up on and taken from the same spool.
Figure 4:
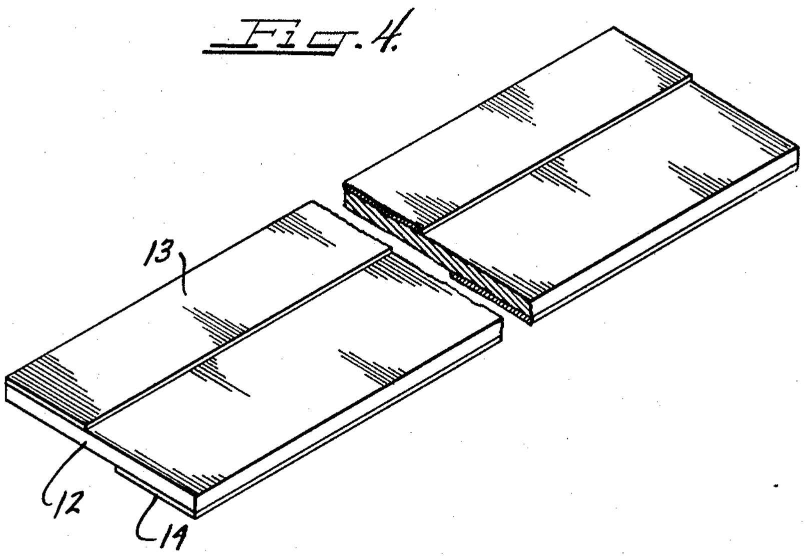
Figure 4 is an enlarged isometric view of the tape record member used in the form of the invention shown in Figure 1, but before it is twisted and had its ends joined together.

One embodiment of the present invention is illustrated in Figures 1 and 4 of the drawing. More particularly, a magnetic tape record member 11 is employed having a main body portion 12 of non-magnetic material, such, for example, as paper or film, and having a magnetic sound track on a magnetizable coating 13 on one side thereof and a magnetic sound track on a magnetizable coating 14 on the other side thereof. Each sound track is substantially half of the width of the tape 12, and these sound tracks on the magnetizable coatings 13 and 14 are located not only on opposite faces of the tape 12, but are also located on opposite lateral halves of the tape 12 (as may be seen best in Figure 4).

The magnetic recorder shown in Figure 1 of the drawing employs a tape, such as that shown in Figure 4, in which one end of the tape 11 is given a half twist about the longitudinal axis of the tape with respect to the other end, and these two ends are then joined together as set at A to form an endless loop such as that shown in Figure 1. It will be observed that the endless loop as shown in Figure 1 now has a half twist in it as is indicated at 15.

This endless loop is supported on suitable guide rollers 16, 17 and 18, as well as on a drive roller 19 which is driven through a belt drive 20 from a motor 21. An electromagnetic transducer head 22 is mounted in the path of movement of the record member 15, and as shown covers only one-half of the width of the record member. If the connection of the two ends of the strip as shown in Figure 4 is located at A, in Figure 1, the head 22 is in contact with the track on the coating 13. Rotation of the loop in a clockwise direction as viewed in Figure 1 will ultimately bring the track section on the coating 14 directly under the head 22 when the joint A passes underneath the head 22.

From a close inspection of Figure 1 and a consideration of this twisting effect of the loop, it will be apparent that two complete loops will, in effect, pass under the head 22 without the head 22 covering the same portion twice. This is true because a complete turn or loop is first made with the track on the coating 13, and then a complete turn is made with the track on the coating 14. The result is that without shifting the magnetic record member laterally, and without moving the electromagnetic transducer head 22 laterally, you are able to obtain an effective length of magnetic record member which is twice the length of the loop.

Figure 5:
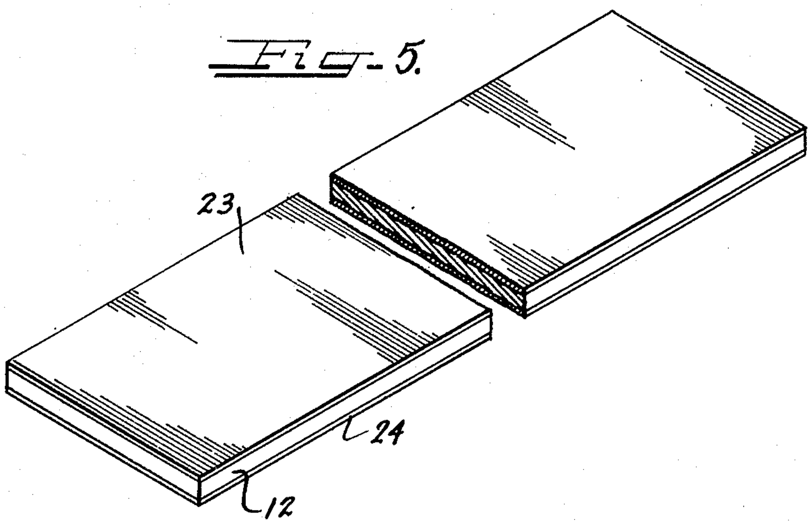
Figure 5 is a view similar to Figure 4 showing the record member used in the form of the invention illustrated in Figure 2 of the drawing.

In the form of the invention shown in Figures 2 and 5 of the drawing, the magnetic record member 11 includes a body or tape portion 12 having a coating of magnetic material 23 extending entirely over one face thereof, and a second coating 24 extending entirely over the other face thereof. In this form of the invention, it is important that the body or tape portion 12 be of sufficient thickness so that one magnetic track does not influence the other, and particularly spaced sufficiently so that during the recording operation a recording is made on the face immediately below the electromagnetic transducer head 25 as shown in Figure 2, and that no recording is made on the opposite face. The ends of the magnetic record member 11 as shown in Figure 5 are twisted and joined together to form an endless loop as shown in Figure 2 of the drawing.

The endless loop is supported on three idler rolls 16, 17 and 18 and is driven by a drive roll 19 through a belt drive 20 in the same manner as the loop in Figure 1.

In the form of the invention shown in Figure 2, the electromagnetic transducer head 25 extends entirely across the width of the record member. As the twisted loop is driven in a clockwise direction by the belt drive 20, one complete turn of the loop causes a magnetic track on the coating 23 to pass below the head 25, and immediately thereafter, a magnetic sound track on the coating 24 passes under the electromagnetic transducer head 25 for one complete turn. After this, the track on the coating 23 is again back beneath the head 25, and this alternate bringing of first one sound track and then the other will continue indefinitely as long as the loop is driven by the belt drive 20.

It will, of course, be understood in connection with the forms of the invention herein described, that the same effect may be obtained by giving the strip which forms the magnetic record member any odd multiple half twists. That is to say, it may be given a half twist, a one and a half twist, a two and a half twist, etc.

In the embodiment of the invention illustrated in Figure 3, an arrangement similar to that shown in Figure 2 is employed using a magnetic record member of the type shown in Figure 5 of the drawing, but in the place of having a simple endless loop, the endless loop includes a spool of the tape as indicated at 26 carried on a support and drive member 27 and rotated through the shaft 28. In this form of the invention, the endless loop is driven in a counter-clockwise direction in order that the record member may be wound up on the exterior portion of the coil 26 and withdrawn from the interior portion thereof. A very long recording may be obtained in this manner and still have an endless record member.

The term "magnetic recorder" as used herein is intended to mean either a magnetic recording device or a magnetic reproducing device, or both.

While I have shown certain particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. An endless magnetic tape record member including a non-magnetic body portion and a pair of magnetic sound tracks thereon, each of said tracks extending not more than one-half the width of the body portion and being disposed on opposite surfaces and adjacent opposite sides of said body portion, said record member having a half-twist therein thereby providing an endless magnetic recording track.

2. A magnetic recorder having an endless magnetic tape record member including a non-magnetic body portion and a pair of magnetic sound tracks thereon, each of said tracks extending not more than one-half the width of the body portion and being disposed on opposite surfaces and adjacent opposite sides of said body portion, said record member having a half-twist therein thereby providing an endless magnetic recording track, and a transducer head of substantially one-half the width of the record member operatively positioned with respect to said endless magnetic recording track whereby an effective track length of substantially twice the length of the record member may be provided to said transducer head without relative lateral movement between said transducer head and said record member.

MARVIN CAMRAS.

References Cited in the file of this patent

UNITED STATES PATENTS

| Number | Name | Date |
|---|---|---|
| 1,365,237 | De Forest | Jan. 11, 1921 |
| 1,442,682 | De Forest | Jan. 16, 1923 |
| 1,840,323 | Leeming | Jan. 12, 1932 |
| 1,853,895 | Eckert | Apr. 12, 1932 |
| 2,050,011 | McCreary | Aug. 4, 1936 |
| 2,443,756 | Williams et al. | June 22, 1948 |
| 2,479,868 | Rossman et al. | Aug. 23, 1949 |
| 2,496,047 | Goddard | Jan. 31, 1950 |
| 2,550,803 | Goddard | May 1, 1951 |

FOREIGN PATENTS

| Number | Country | Date |
|---|---|---|
| 324,009 | Great Britain | Jan. 17, 1930 |
| 340,705 | Great Britain | Jan. 8, 1931 |
| 227,380 | Switzerland | Sept. 1943 |

OTHER REFERENCES

Publication I, British specification 512,766 "Method and Apparatus for Recording and Reproducing Low Frequency Vibrations," printed in Great Britain, 1939. Copy in Scientific Library. 274–41.4.